United States Patent
Rybicki et al.

[11] Patent Number: 6,128,354
[45] Date of Patent: Oct. 3, 2000

[54] DATA DETECTION PRE-AMPLIFIER CIRCUIT

[75] Inventors: Mathew A Rybicki; H. Spence Jackson; Shahriar Rokhsaz, all of Austin, Tex.

[73] Assignee: Sigmatel, Inc., Austin, Tex.

[21] Appl. No.: 09/197,653

[22] Filed: Nov. 23, 1998

Related U.S. Application Data

[62] Division of application No. 08/822,338, Mar. 20, 1997, Pat. No. 5,892,800.

[51] Int. Cl.[7] .................................................. H04L 27/08
[52] U.S. Cl. .......................... 375/345; 330/282; 330/291; 330/293
[58] Field of Search .................................... 375/345, 318; 330/85, 86, 282, 284, 278, 291, 293

[56] References Cited

U.S. PATENT DOCUMENTS

| | | |
|---|---|---|
| 4,704,584 | 11/1987 | Smither ............................ 330/86 |
| 5,231,395 | 7/1993 | Irwin et al. . |
| 5,592,165 | 1/1997 | Jackson et al. . |
| 5,744,944 | 4/1998 | Danstrom ........................... 323/284 |
| 5,872,482 | 2/1999 | Krauss ............................... 327/561 |
| 5,929,706 | 7/1999 | Haruta et al. ...................... 330/279 |

*Primary Examiner*—Stephen Chin
*Assistant Examiner*—Mohammad Ghayour
*Attorney, Agent, or Firm*—Timothy W Markison

[57] ABSTRACT

A pre-amplifier circuit, which may be used in a variety of data recovery circuits to accurately recover data transmissions, includes an input regulatory circuit, a feedback circuit, and an amplifier. The input regulatory circuit regulates the magnitude of the data signal provided to the amplifier based on feedback signals from a feedback circuit. For low level data signals, the input regulatory circuit provides a fill, or almost full, representation of the data signal to the amplifier for amplification. But, when the data signal levels increase, the input regulatory circuit attenuates, based on the feedback signals, the data signals more and more before providing them to the amplifier, such that the output of the amplifier stays within a certain range.

5 Claims, 5 Drawing Sheets

“Data Detection Circuit Having a Pre-Amplifier Circuit” filed on Mar. 20, 1997, having a Ser. No. 08/822,338, now U.S. Pat. No. 5,892,800.

TECHNICAL FIELD OF THE INVENTION

This invention relates generally to data detection and more particularly to a circuit for detecting transmitted data having a large dynamic range.

BACKGROUND OF THE INVENTION

Transmission of data from one device to another can be done using a variety of transmission mediums; including, but not limited to, infrared, coaxial cable, twisted pair, and radio frequency (RF). Each of these transmission mediums has certain advantages and disadvantages. For example, coaxial cable and twisted pair transmission mediums provide highly reliable and private long transmission paths (i.e., low error rate), but require the devices exchanging the data to be physically coupled together. RF and infrared transmission mediums remove the need for physical coupling, but are not private, don't have the transmission range of wireline, and require recovery circuits to have a wide dynamic range.

Because of the convenience of wireless connections (i.e., RF and infrared) many conventional wireline connections (coaxial cable and twisted pair) are being replaced with wireless connections. For example, coupling of a printer to a personal computer has traditionally been accomplished using a coaxial cable, but, because of new developments in infrared technology, such coupling is now being done using an infrared transmission path. One relatively new infrared technology making wireless connection practical is Pulse Position Modulation (PPM). In essence, PPM works by dividing 500 nSec time slots into four sections and providing a light pulse in one of the sections. If the light pulse occurs in the first section, the data being transmitted is representative of digital data 00; in the second section: digital data 01, in the third section: digital data 10; and in the forth section: digital data 11. Thus, PPM provides up to 4 Mbps of data transfer capability, which is more than adequate to support many traditional wireline connections.

While PPM provides sufficient data transmission rates, it requires data recovery circuits to have a wide dynamic range and to be of high fidelity. One such data recovery circuit is a limiting circuit. The limiting circuit includes an amplifier having its gain limited such that when the input signal exceeds a certain threshold, the output of the amplifier is limited to a certain value. The limiting circuit works well (i.e., is of high fidelity) when the magnitude of the received pulse is small but, when the magnitude is large, the output of the amplifier, because of the limiting, distorts the pulse width of the received pulse. Thus, for many applications, the limiting circuit is not acceptable.

Another type of data recovery circuit is a multi-stage automatic gain control (AGC) circuit. The AGC circuit includes at least two AGC stages, an AC coupling element, and an amplifier. While the AGC circuit provides the needed dynamic range and improves the fidelity, in comparison with the limiting circuit, it adds a number of additional components which increases noise. Depending on the noise requirements of a new data recovery circuit design, the AGC may not provide sufficient performance. In addition, because of the additional components, the AGC increases the cost and power of a circuit employing it as well as taking up more real estate. Two critical factors to minimize in the design of integrated circuits (IC).

Therefore, a need exists for a circuit that provides the needed fidelity and dynamic range to recover digital data without the drawbacks of the limiting circuit and the AGC circuit.

DETAILED DESCRIPTION OF THE DRAWINGS

Generally, an embodiment of the present invention provides a pre-amplifier circuit that may be used in a variety of data recovery circuits to accurately recover data transmissions. The pre-amplifier circuit is especially adept at providing a high fidelity amplified representations of transmitted signals that have a wide dynamic range. For example, infra-red transmitted signals which have a dynamic range of 100,000 (100 nA to 10 mA). To achieve the high fidelity for wide dynamic range signals, the pre-amplifier circuit combines the beneficial features of the limiting circuit and the AGC circuit of the prior art without the mentioned limitations. In operation, an input regulatory circuit regulates the magnitude of a received data signal which is subsequently provided to an amplifier. The regulation of the data signal is based on feedback signals from a feedback circuit. For low level data signals, the input regulatory circuit provides a fill, or almost full, representation of the received data signal to the amplifier for amplification. But, when the data signal levels increase, the input regulatory circuit attenuates, based on the feedback signals, the received data signals more and more before providing them to the amplifier, such that the output of the amplifier stays within a certain range. Thus, for large level data signals, limiting is achieved and fidelity maintained without the complexity of multiple AGC circuit and without the distortion of the limiting circuit.

Figure 1:
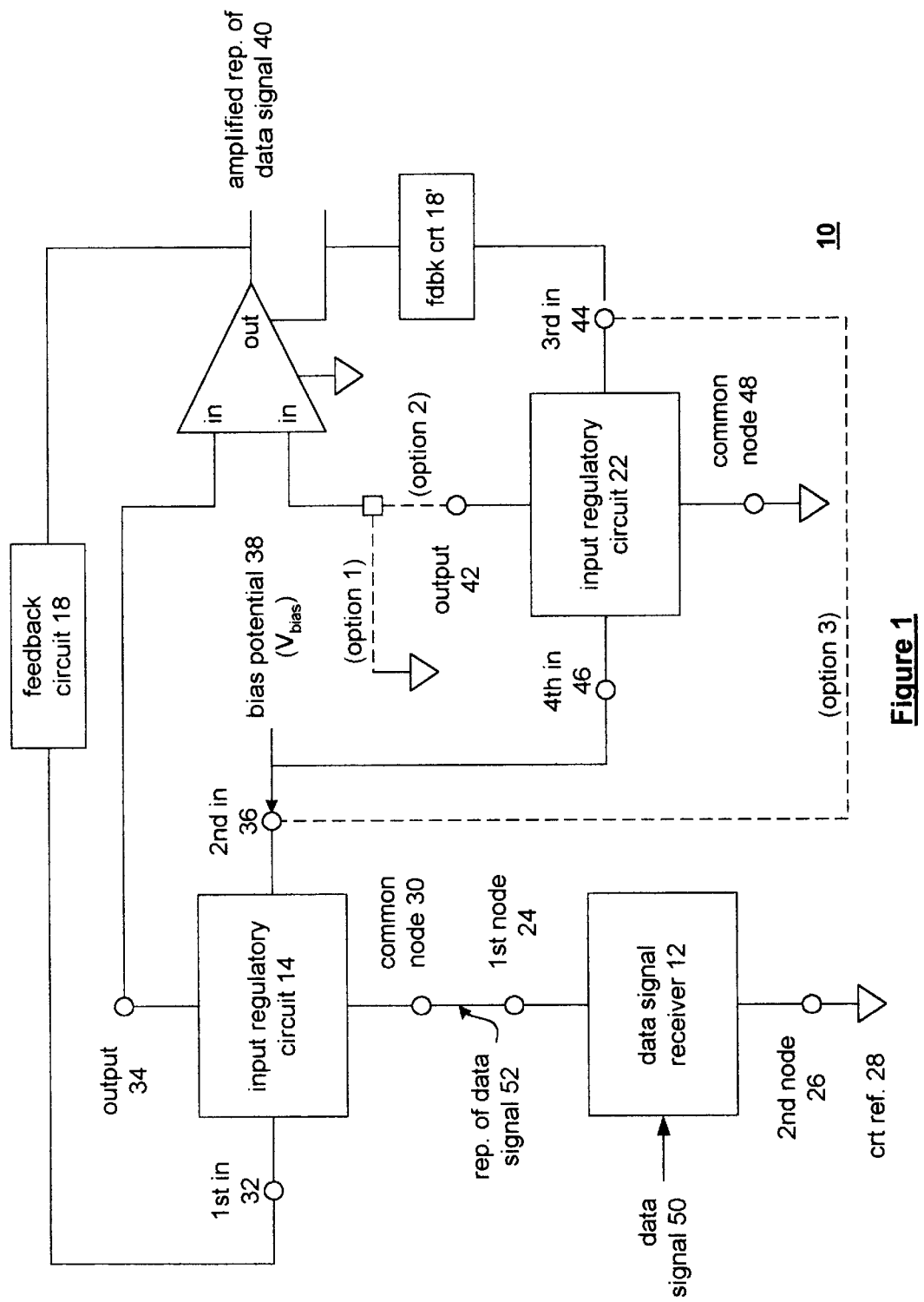
FIG. 1 illustrates a schematic block diagram of a data detection pre-amplifier circuit which is in accordance with the present invention.

The present invention can be more fully described with reference to FIGS. 1–5. FIG. 1 illustrates a schematic block diagram of a pre-amplifier circuit 10 which includes a data signal receiver 12, an input regulatory circuit 14, an amplifier 16, and a feedback circuit 18. The data signal receiver 12 has a first node 24, which is coupled to a 15 common node 30 of the input regulatory circuit 14, and a second node 26, which is coupled to a circuit reference 26. The circuit reference 26 may be a circuit return (0 volts or the negative rail voltage) or a virtual ground. In addition to the common node 30, the input regulatory circuit 14 includes two inputs: one 32 is coupled to the feedback circuit 18, the other 36 is coupled to a bias potential 38, which may be fixed or variable; and an output 34, which is coupled to an input of the amplifier 16. The other input of the amplifier 16 is coupled to either the voltage reference 29 or to a second input regulatory circuit 22. The output of the amplifier 16 is coupled to the feedback circuit 18 to which completes the feedback loop.

In single-ended operation (i.e., the second input of the amplifier 16 is coupled to the voltage reference 29), the data signal receiver 12 receives data signals 50 and provides them, or a representation thereof 52, to the common node 30 of the input regulatory circuit 14. The input regulatory circuit 14 supplies, at its output 34, a regulated version of the data signal 50 to the input of the amplifier 16. The regulated version of data signal 50 is based on the feedback signals provided to the first input 32 in relation to the bias potential 38 at the second input 36. When the feedback signals provided to the first input 32 are low with respect to the bias potential (i.e., indicating that the magnitude of the data signals 50 are low), the version of the data signals provided to the amplifier are substantially unattenuated representations of the data signals 50. The amplifier then amplifies the substantially unattenuated data signals to produce an amplified representation 40 of the data signals.

Conversely, when the feedback signals provided to the first input 32 are high with respect to the bias potential (i.e., indicating that the magnitude of the data signals 50 are high), the version of the data signals are attenuated representations of the data signals 50. By attenuating the data signals prior to amplification, saturation of the amplifier is avoided while the pulse width fidelity of the data signals is maintained. As one skilled in the art will readily appreciate, the 'high-low' relationship between the first input and second input of the input regulatory circuit could easily be of opposite polarity.

The pre-amplifier circuit of FIG. 1 further illustrates two optional configurations for providing differential operation. In the first differential configuration option (designated as option 2 in the figure), the pre-amplifier circuit 10 includes the second input regulatory circuit 22, a second feedback circuit 18', and a second amplifier output. As shown, the second input regulatory circuit 22 includes a common node 48, which is coupled to the circuit reference 28, an output 42, which is coupled to the second input of the amplifier, and a pair of inputs: one 44 is coupled to the second feedback circuit 18' and the other 46 is coupled to the bias potential 38. The second feedback circuit 18' is coupled to the second amplifier output to complete the feedback path.

In the second differential configuration option (designated as option 3 on the figure), the second input of the amplifier 16 is coupled to the voltage reference 29 and the second input 36 of the input regulatory circuit 14 is coupled to the second feedback circuit 18' instead of the bias potential 38. In this configuration, the feedback provided by the second feedback circuit 18' is a complement of the feedback provided by the feedback circuit 18. As one skilled in the art will readily appreciate, the feedback circuit 18 and the second feedback circuit 18' may be independent circuits or they may be combined into one circuit.

Figure 2:
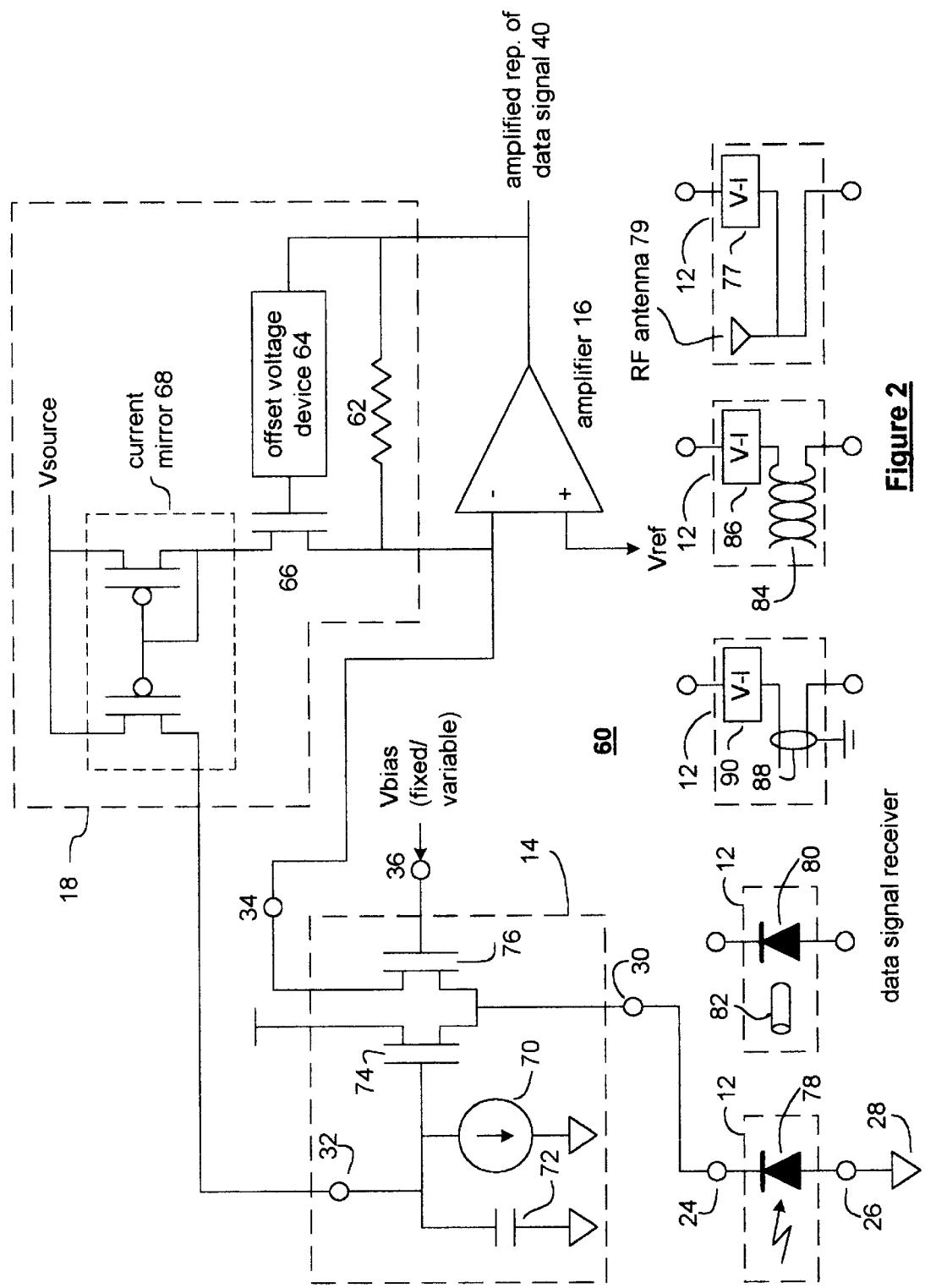
FIG. 2 illustrates a schematic block diagram of a variant embodiment of the data detection pre-amplifier circuit of FIG. 1.

FIG. 2 illustrates a schematic block diagram of a variant embodiment of the data detection pre-amplifier circuit of FIG. 1. In this embodiment, the input regulatory circuit 14 is shown to include a differential input circuit consisting of a pair of transistors 74, 76, which may be n-channel field effect transistors, but may also be p-channel FETS, bipolar transistors, or any type of transistor, or the like device. The input regulatory circuit 14 is further shown to include a current source 70 and a storage capacitor 72. The feedback circuit 18 is shown to include a current mirror 68, a shunting transistor 66, a feedback impedance 62, and an offset voltage device 64. The data signal receiver 12 is shown to be any one of a number of circuits. For example, the data signal receiver 12 may be comprised of (1) a coaxial cable 88 and possibly a voltage to current converter 90; (2) a twisted wire pair 84 and possibly a voltage to current converter 86; (3) a light 15 receiving diode 80 and a fiber optic cable 82, (4) a light receiving diode 78; or (5) a radio frequency (RF) receiver having an RF antenna 79 and possibly a voltage to current converter 77.

As an illustrative example of the operation of the circuit of FIG. 2, assume that the amplifier output range is design limited to be between 5 mV and 200 mV, the feedback impedance 62 is a 50K-ohm resistor, the data signal receiver 12 is comprised of the light receiving diode, and the dynamic range of the data signal is between 100 nAmps and 10 mAmps. Given these assumptions, when data signal receiver 12 receives a data signal 50, it sinks a current representation of the data signal from the common node of the input regulatory circuit 14. Note that when the data signal receiver 12 includes the light receiving diode, the data signal is received in a current state, but when the other circuits are used, the data signal is typically received as a voltage, hence the need for the voltage to current converters 77, 86, 90.

The current representation of the data signal is regulated by the input regulatory circuit 14 based on feedback signals from the feedback circuit 18. Such regulation will keep the output of the amplifier between 5 and 200 mV, which is dynamic range of 40, even though the dynamic range of the data signal is 100,000. To regulate the current representation of the data signal, the feedback circuit 18 monitors the amplified representation of the data signal 40 at the output of the amplifier. When the amplified data signal approaches the designated maximum threshold (for this example: 200 mV), transistor 66 begins to draw current. As current begins to flow through transistor 66, a mirrored current is supplied to the input regulatory circuit 14 by the current mirror 68. Note that the offset voltage device 64 is designed to provide the proper bias voltage to transistor 66 such that when the amplified signal approaches 200 mV transistor 66 begins to draw current. The offset voltage device 64 may be a battery, a diode, a transistor, or any other device, or combination of devices, that provides a DC offset voltage, or current if transistor 66 is bipolar.

The mirrored current provided to the first input 32 of the input regulatory circuit 14 is fed to the storage capacitor 72 and the current source 70. As current is supplied to the storage capacitor 72, a voltage builds across it, causing transistor 74 to become more active (i.e., draws more current as it approaches its saturation range). When transistor 74 becomes more active, it supplies more current to the data signal receiver 12, regulating the current flowing through transistor 76 to maintain the output of the amplifier at a desired level.

Using Ohm's law, one can readily see that the maximum current which the data signal receiver 12 can sink from transistor 76 before some of the current has to be supplied by transistor 74 is (200 mV/50K-ohms)=4 micro-Amps. Thus, when the data input signal sinks a current less than 4 micro-Amps, the pre-amplifier circuit simply amplifies the representation of the data signal 50. But, when the current reaches or exceeds 4 micro-Amps, the pre-amplifier circuit limits the output voltage of the amplifier 16 via the feedback circuit 18 and the input regulatory circuit 14 by attenuating the input signal before it is provided to the amplifier 16.

Such limiting, however, is done without distorting the pulse width of the data signal, which for Pulse Positioning Modulation PPM) or Amplitude Shift Keying (ASK), is important to accurately decode the data signal.

Figure 3:
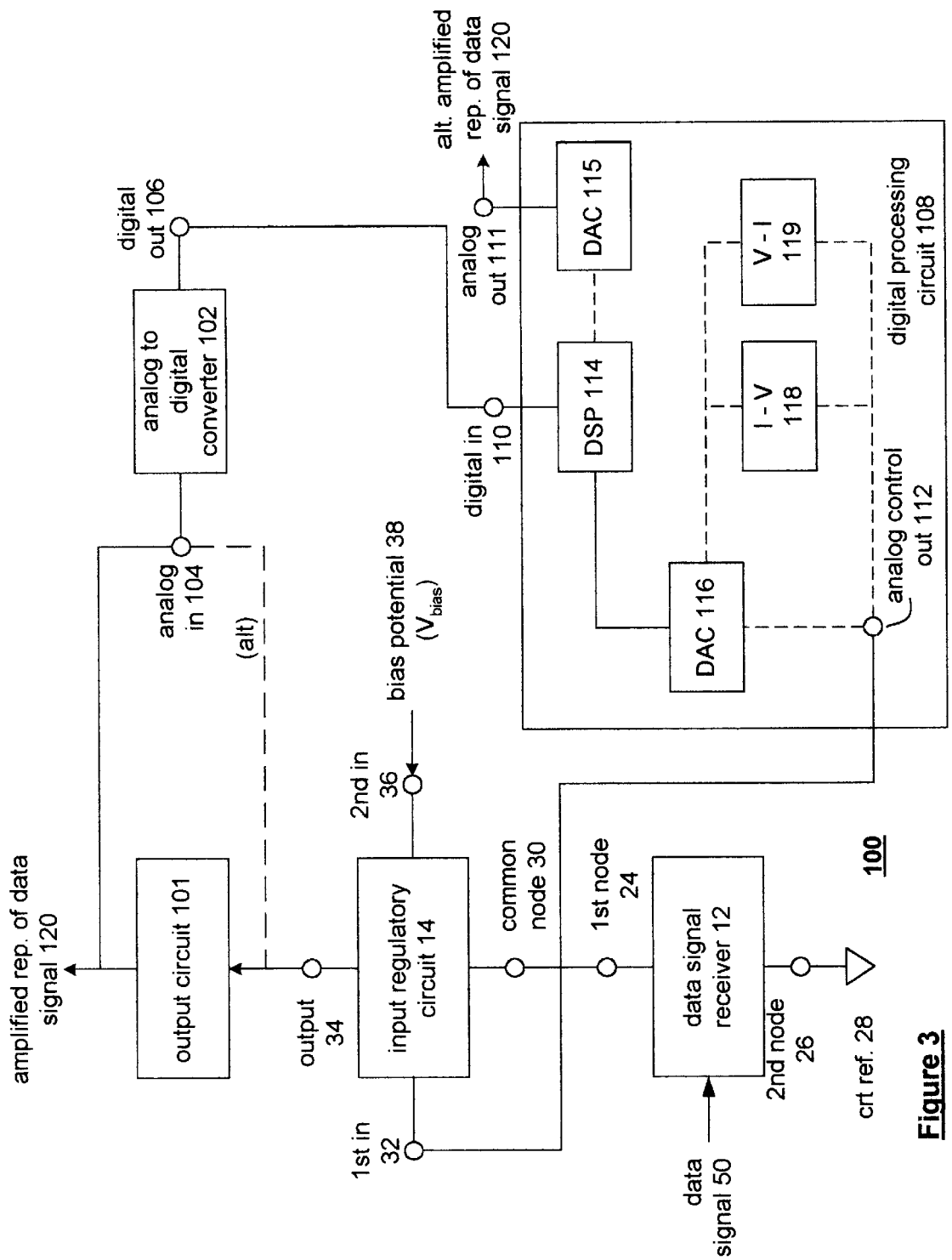
FIG. 3 illustrates a schematic block diagram of an alternate embodiment of the data detection pre-amplifier circuit which is in accordance with the present invention.

FIG. 3 illustrates an alternate embodiment of a pre-amplifier circuit 100. In this embodiment, digital processing circuitry is used to provide the feedback signals to the input regulatory circuit 14 and may also be used to produce the amplified representation 120 of the data signal. It is contemplated that this embodiment may be most applicable on an integrated circuit that already includes a digital signal processor (DSP) and a digital to analog converter (DAC), since the digital processing of the pre-amplifier is not overly intensive such that a dedicated DSP and DAC would not required. While this is the contemplated approach, one skilled in the art will readily appreciate that the pre-amplifier circuit could be designed with its own DSP and DAC or using any other combination of digital components to produce the desired effects of the pre-amplifier circuit of the present invention.

As shown, the pre-amplifier circuit 100 includes the data signal receiver 12, the input regulatory circuit 14, an output circuit 101, an analog to digital converter 102, and a digital processing circuit 108. The inter-operable coupling of the pre-amplifier circuit 100 is as follows: The first node 30 of the data signal receiver 12 is coupled to the common node of the input regulatory circuit 14 while the second node 26 is coupled to the circuit reference 26; The first input 32 of the input regulatory circuit 14 is coupled to the analog control output 112 of the digital processing circuit 108, the second input 36 of the input regulatory circuit 14 is coupled to the bias potential 38, and the output 34 of the input regulatory circuit 14 is coupled to the output circuit 101; the analog input 104 of the analog to digital converter 102 is coupled to the output of the output circuit 101; and the digital output 106 of the analog to digital converter 102 is coupled to the digital input 110 of the digital processing circuit 108.

As is further shown, the digital processing circuit 108 is shown to include a DSP 114 and two DACs 115 and 116. DAC 116 may be coupled directly to the analog output 112, coupled to a current to voltage converter 118, or coupled to a voltage to current converter 119. The particular connection of DAC 116 to the analog output 112 depends on the type of DAC and the input requirements of the input regulatory circuit 14. For example, if DAC 116 provides a voltage output and the input 32 of the input regulatory circuit 14 is a voltage input, then DAC 116 would be directly connected to the analog output 112. If DAC 116 provides a current output and the input 32 of the input regulatory circuit 14 is a voltage input, then DAC 116 would be coupled to the current to voltage converter 118. If, however, DAC 116 provides a voltage output and the input 32 is a current input, then DAC 116 would be coupled to the voltage to current converter 119. Finally, if DAC 116 provides a current output and the input 32 is a current input, 10 then DAC 116 is directly coupled to the analog output 112. Note that DAC 115 would only be used if the digital processing circuit 108 is to provide the amplified representation of the data signal 120. If this is the case, then the output circuit 101 would not be needed.

In operation, the input regulatory circuit 14 is coupled to receive a bias potential, 15 the data signal, or a representation thereof, from the data signal receiver 12, and a control signal 121 from the digital processing circuit 108. Based on these inputs, the input regulatory circuit 14 may attenuate the received data signal and supplies the signal at its output to the output circuit 101. The output circuit 101, which may be a resistor coupled to a voltage supply, an amplifier with fixed feedback, or any circuit that would produce the desired polarity of the amplified data signal, produces the amplified representation 120 of the data signal.

The amplified representation 120 of the data signal produced by the output circuit 101 is converted to a digital signal by the analog to digital converter 102. This digital signal is provided to the DSP 114 of the digital processing circuit 108. The DSP 114 processes the digital signal to produce a digital version of the control signal 121 which is converted to an analog signal by DAC 116. Alternatively, the input of the analog to digital converter 102 could be directly coupled to the output of the input regulatory circuit 14 such that the output of the input regulatory circuit is converted to a digital signal and subsequently processed by the DSP 114.

In an alternate operation, the output 34 of the input regulatory circuit 14 is coupled to the analog input 104 of the analog to digital converter 102. Such coupling may require a current to voltage conversion circuit depending on whether the output of the input regulatory circuit is a current output and the input of the analog to digital converter 102 is a voltage input. The digital output 106 of the analog to digital converter 102 is coupled to the DSP 114 of the digital processing circuit 108. The DSP 114 processes the signals it receives and provides digital control signals to DAC 116 and a digital representation of the amplified representation of the data signal to DAC 115. DAC 115 then produces the amplified representation 120 of the data signal.

The processing done by the DSP 114 is as follows: Compare the digital signal received from the analog to digital converter 102 to a digital threshold. The digital threshold is representative of the desired analog limitations of the amplified representation 120 of the data signal. If the received digital signal is less than the digital threshold, the DSP 114 generates a non-attenuation control signal. If, however, the received digital signal is greater than the digital threshold, the DSP 114 generates an attenuation control signal, which includes the degree of attenuation.

Figure 4:
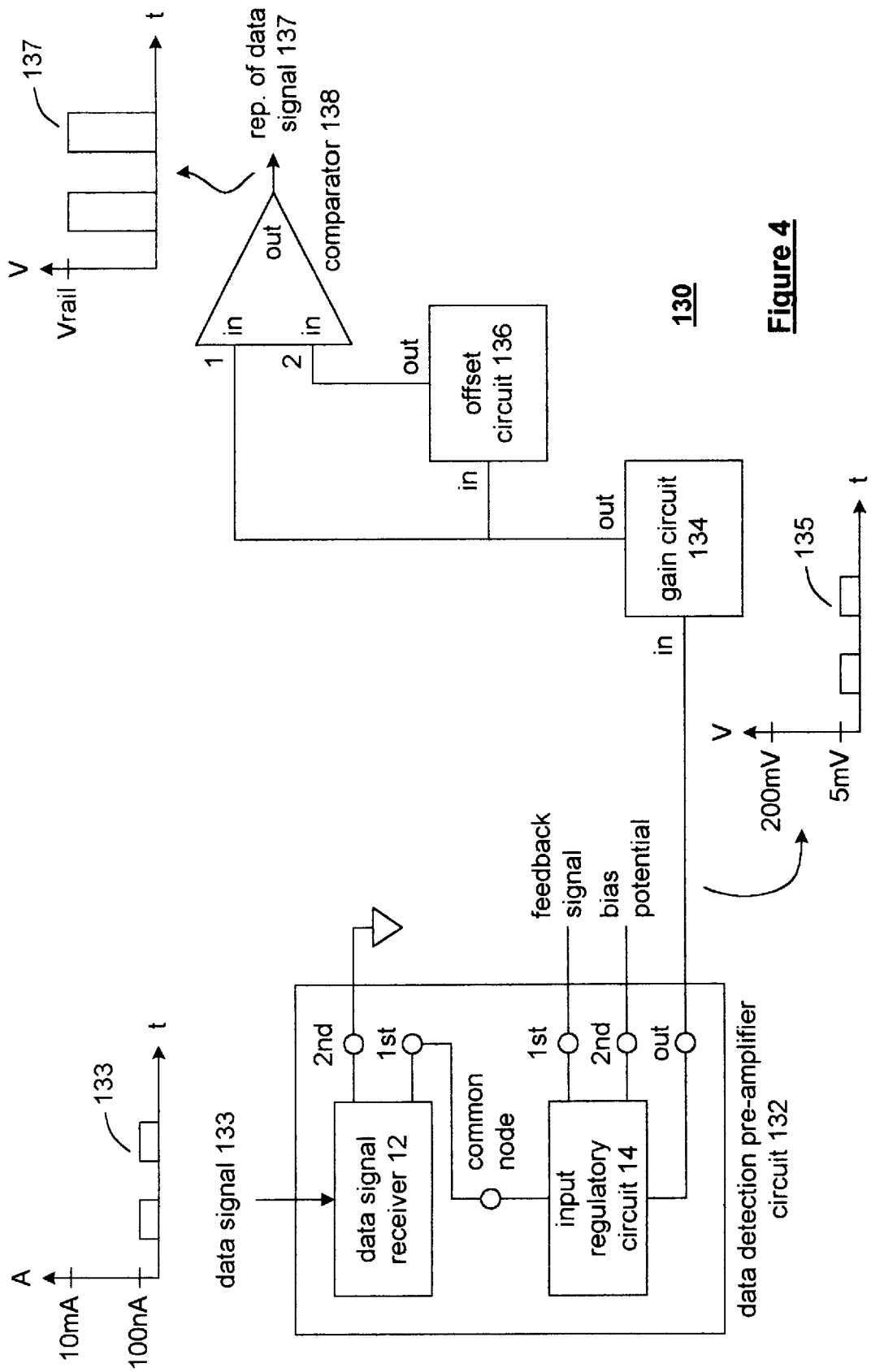
FIG. 4 illustrates a schematic block diagram of a data detection circuit which is in accordance with the present invention.

FIG. 4 illustrates a schematic block diagram of a data detection circuit 130 that includes a data detection pre-amplifier circuit 132, a gain circuit 134, an offset circuit 136, and a comparator 138. The data detection pre-amplifier circuit 132 includes a data signal receiver 12 having its first input coupled to a common node of an input regulatory circuit 14. A second input of the data signal receiver 12 is coupled to a circuit reference, while the input regulatory circuit 14 has two inputs to receive a feedback signal and a bias potential. The output of the input regulatory circuit 14 is operably coupled to the input of the gain circuit 134. Such operably coupling may be done via an amplifier similar to the amplifier 16 of FIG. 1 or to the output circuit 101 of FIG. 3.

In operation, the data signal receiver 12 receives a current representation 133 of the data signal. As shown, the magnitude of the current data signal is in the range of 100 nAmps to 10 mAmps. The data detection pre-amplifier circuit 132 converts the current data signal into a low level voltage data signal 135. As shown, the magnitude of the low level voltage data signal 135 is in the range of 5 mVolts to 200 mVolts. The gain circuit amplifies the low level voltage data signal 135 and provides it as an input to the comparator 138. The other input of the comparator 138 is coupled to the offset circuit 136 which provides an offset voltage such that there is a measurable difference between the inputs of the comparator 138. The output of the comparator 138 is a full voltage level data signal 137, which has a magnitude from rail to rail.

Figure 5:
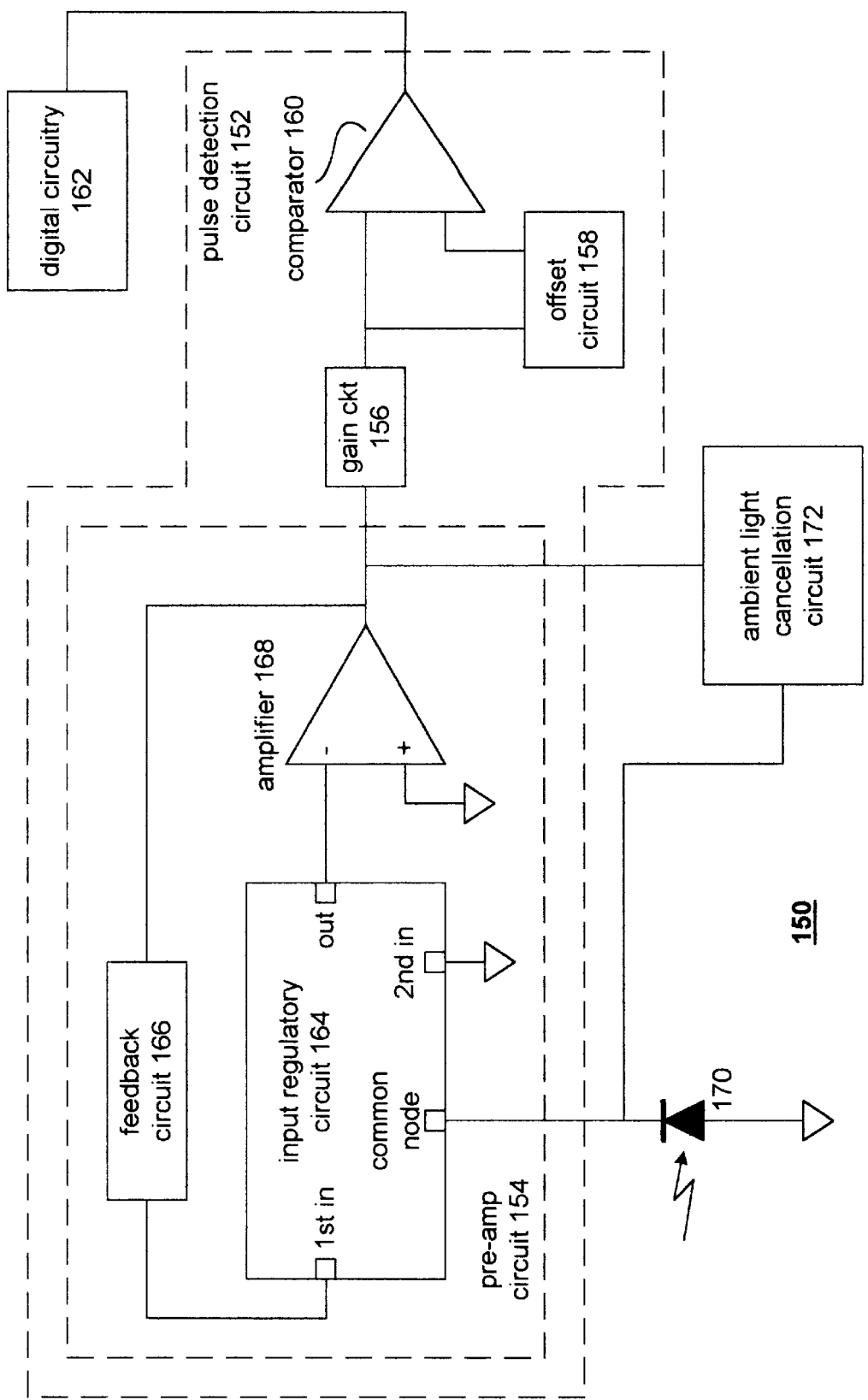
FIG. 5 illustrates a schematic block diagram of an infrared data processing circuit which is in accordance with the present invention.

FIG. 5 illustrates a schematic block diagram of an infra-red data processing circuit 150 that includes a pulse detection circuit 152, digital circuitry 162, a light sensing, or PIN, diode 170, and an ambient light cancellation circuit 172. The pulse detection circuit 152 includes a pre-amplifier circuit 154, a gain circuit 156, an offset circuit 158, and a comparator 160. The pre-amplifier circuit 154 includes a feedback circuit 166, an amplifier 168, and an input regulatory circuit 164. For the purposes of this 15 discussion, the pulse detection circuit 152 functions similarly to the data detection circuit 130 of FIG. 4.

In operation, the light sensing diode 170 receives a light pulse data signal which is provided to the input regulatory circuit 164. As previously discussed, the input regulatory circuit provides a version of the received data signal to the amplifier 168 which amplifies the data signal to produce a pre-amplified data signal. The ambient light cancellation circuit 172 functions as its name implies: it cancels the ambient light portion of the received data signal and prevents it from being amplified by amplifier 168. The pre-amplified data signal is then provided to the gain circuit 156 and subsequently to the comparator 160. The comparator 160 produces a rail to rail representation of the received data signal while maintaining the pulse width integrity.

The digital circuitry 162 receives the rail to rail representation of the data signal and can interpret the data for an almost endless variety of applications. For example, assume that the infra-red data processing circuit 150 is used by a personal computer and printer to convey information therebetween. The digital circuitry interprets the pulse data, which may be in a PPM, return to zero inverted (RTZ), or ASK format, to facilitate the transfer of information between the personal computer and the printer.

The present invention has been described with reference to a plurality of different embodiments to provide limiting of an incoming data signal while preserving its pulse width fidelity and without the limitations of the limiting circuit and the AGC circuits of the prior art. As such, the present invention can be used in a variety of discrete circuit applications or integrated circuit applications where pulse width fidelity is an important issue as well as minimizing circuit complexity.

What is claimed is:

1. A data detection pre-amplifier circuit comprising:

an input regulatory circuit having a first input, a second input, an output, and a common node, wherein the common node is operably coupled to receive a signal representative of a data signal from a data signal receiver and the second input is operably coupled to a bias potential;

an analog to digital converter having an analog input and a digital output, wherein the analog input is operably coupled to the output of the input regulatory circuit; and a digital processing circuit having a digital input and an analog output, wherein the digital input is operably coupled to the digital output of the analog to digital converter and the analog output of the digital processing circuit is operably coupled to the first input of the input regulatory circuit, and wherein the digital processing circuit provides an analog control signal to regulate signals through the input regulatory circuit to provide an amplified representation of the data signal at the output of the input regulatory circuit.

2. The data detection pre-amplifier circuit of claim 1, wherein the digital processing circuit comprises a digital to analog converter operably coupled to a digital signal processor.

3. The data detection pre-amplifier circuit of claim 1, wherein the data signal receiver includes at least one of a fiber optics receiver, a coaxial cable receiver, a twisted pair receiver, or radio frequency receiver.

4. The data detection pre-amplifier circuit of claim 3 further comprises a voltage to current conversion circuit operably coupled to the first node of the data signal receiver.

5. The data detection pre-amplifier circuit of claim 1 further comprises a current to voltage conversion circuit operably coupled to the analog output of the digital processing circuit.

* * * * *